July 30, 1968  W. H. SINK  3,394,788
SPRING LOADED CLUTCH

Filed May 10, 1966  9 Sheets-Sheet 1

FIG. 1

INVENTOR.
WILLIAM H. SINK
BY Walter E. Pavlick
Harold D. Steel
Calmber B Foley

ATTORNEYS

FIG. 2

July 30, 1968 W. H. SINK 3,394,788
SPRING LOADED CLUTCH

Filed May 10, 1966 9 Sheets-Sheet 3

INVENTOR.
WILLIAM H. SINK
BY *Walter E. Parlich*
*Harold D. Hall*
*Richard B Farley*
ATTORNEYS

INVENTOR.
WILLIAM H. SINK
BY Walter E. Pavlick
Harold D. Shall
Richardson B Farley
ATTORNEYS July 30, 1968  W. H. SINK  3,394,788
SPRING LOADED CLUTCH Filed May 10, 1966  9 Sheets-Sheet 5

INVENTOR.
WILLIAM H. SINK
BY Walter E. Pavlick
Harold D. Hall
Richard B Farley
ATTORNEYS July 30, 1968

W. H. SINK 3,394,788

SPRING LOADED CLUTCH

Filed May 10, 1966

INVENTOR.
WILLIAM H. SINK
BY Walter E. Pavlick
Harold D. Stall
Richard B. Farley
ATTORNEYS July 30, 1968

W. H. SINK

3,394,788

SPRING LOADED CLUTCH

Filed May 10, 1966

INVENTOR.
WILLIAM H. SINK
BY Walter E. Pavlick
Harold D. Hall
Richardson B. Farley
ATTORNEYS July 30, 1968 W. H. SINK 3,394,788
SPRING LOADED CLUTCH
Filed May 10, 1966 9 Sheets-Sheet 8

INVENTOR.
WILLIAM H. SINK
BY Walter E. Pavlick
Harold D. Shall
Richard B Farley
ATTORNEYS July 30, 1968 W. H. SINK 3,394,788
SPRING LOADED CLUTCH
Filed May 10, 1966 9 Sheets-Sheet 9

INVENTOR.
WILLIAM H. SINK
BY Walter E. Pavlick
Harold D. Hall
Richard B. Finlay
ATTORNEYS United States Patent Office 3,394,788
Patented July 30, 1968

3,394,788
SPRING LOADED CLUTCH
William H. Sink, Auburn, Ind., assignor to Dana Corporation, Toledo, Ohio, a corporation of Virginia
Filed May 10, 1966, Ser. No. 549,009
28 Claims. (Cl. 192—89)

ABSTRACT OF THE DISCLOSURE

A clutch is provided in which a series of spaced compression springs are disposed angularly with respect to the axis of rotation of the pressure plate. The compression springs react directly or indirectly between the flywheel and pressure plate to urge the clutch into engaged position with the compression springs mounted so that their mounting means move axially relatively towards each other at a constant radial distance from each other. The axial change in distance for the mounting means results in a shift in the angular relationship of each spring such that the effective spring force component providing the urging force on the pressure plate reduces at a lower than normally expected rate between full engaged and wear position and increases at a lower than normally expected rate between engaged and release position. The spring arrangement for the clutch thereby provides a clutch having lowered clutching pressure and reduced wear due to higher loading pressure under wear conditions.

This invention relates generally to normally engaged, spring loaded friction clutches and more particularly to a novel arrangement of the spring means utilized therein to provide a substantial reduction in clutch disengaging force and to additionally provide spring compensation so that, as clutch plate wear occurs, a substantially constant spring pressure clutch engaging force is provided.

Spring loaded friction clutches normally utilize spring means for urging driving and driven members into a frictional engagement to engage the transmission to a vehicle engine. Friction clutches, thus, must be capable of transmitting high torque loads so that the engaging springs employed must be extremely strong so as to exert a biasing force of high magnitude to obtain sufficient pressure between the driving and driven members. However, the more positive the clamping pressure the greater is the effort required of the vehicle operator to overcome the force of the springs during the disengaging operation of the clutch. An additional disadvantage presented by this standard type of clutch is that, when wear on the clutch plate begins, the compression springs utilized in the clutch must elongate for the increased axial distance required to engage the clutch plate with the driving member. Due to the elongation of the compression springs there results a reduction in the engaging pressure and a consequent increase in slippage and additional wear between the clutch and driving members.

Although friction clutches are generally provided with a manual means to adjust for this wear, an automatic acting means would be very desirable and also highly advantageous if such a means required only small foot pressure on the clutch pedal to disengage the driving surfaces of the clutch.

It is therefore an object of the present invention to improve the operation of a spring loaded friction clutch by providing an improved spring mounting and arrangement so that the normal appreciable increase in pedal pressure in the course of clutch disengaging movement is not experienced.

It is another object of this invention to provide a clutch whose loading pressure reduces as a result of wear on the clutch plate at a much lower rate than experienced in conventional clutches.

It is an additional advantage of this invention to provide automatic compensating means to limit the loss in loading pressure due to clutch plate wear.

It is a further object of this invention to reduce the amount of pedal pressure required to disengage the clutch.

It is a still further object of this invention to provide means for reducing the wear on the clutch plate by limiting the loss in loading pressure due to such wear.

It is an additional object of this invention to provide a clutch in which the action and reaction load bearing portions of the clutch move in planes parallel to the axial direction.

Other and further objects of this invention will be apparent from the following description and claims, and may be understood by reference to the accompanying drawings which, by way of illustration, show preferred embodiments of the invention and what is considered to be the best mode of applying the above principles.

In the preferred form of this invention a clutch cooperable with a driving member in the form of a flywheel includes a pressure plate which is biased toward a driven friction disc, disposed intermediate the flywheel and pressure plate, by a series of circumferentially spaced compression springs which are disposed angularly with respect to the axis of rotation of the pressure plate. Reaction means are carried by the flywheel and reactively cooperate with the reaction end of the compression springs while action means engaging the action end of the spring means and connect the latter to the pressure plate in such a manner that the biasing force of the spring urges the pressure plate toward the friction disc. The action and reaction means in the clutch engaged position are both axially and radially spaced with respect to each other and, upon movement of the pressure plate towards its disengaged position, the axial spacing between the action and reaction means is decreased while the radial spacing remains constant.

This axial decrease in distance between the action and reaction means with a constant radial distance therebetween results in a shift in the angular relationship of the spring such that the effective spring force component providing an urging force on the pressure plate reduces at a lower than normally expected rate between full engaged and wear positions and increases at a lower than normally expected rate between engaged and released positions. Thus, the novel spring arrangement provides the aforementioned advantage of lowering declutching pressure and reduced wear due to a higher loading pressure under wear conditions.

Figure 1:
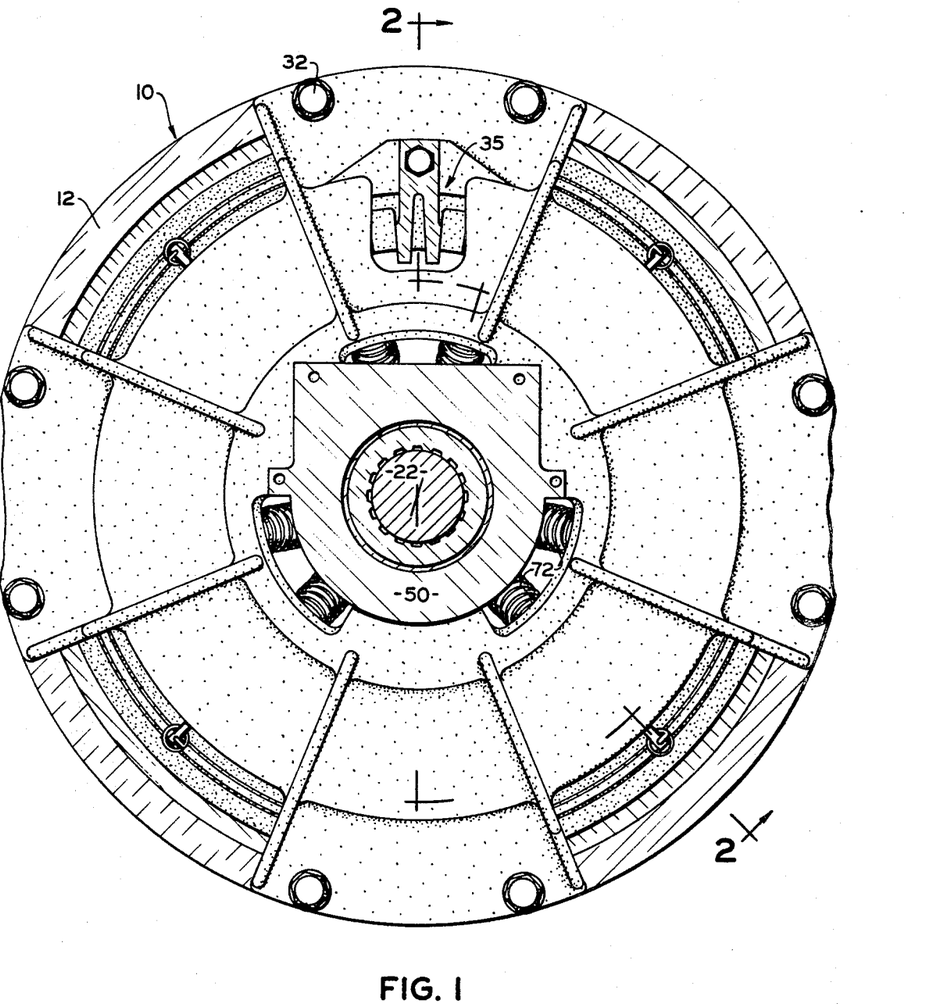
FIG. 1 is an elevational view looking from the throw-out bearing end of a clutch embodying this invention.
Figure 2:
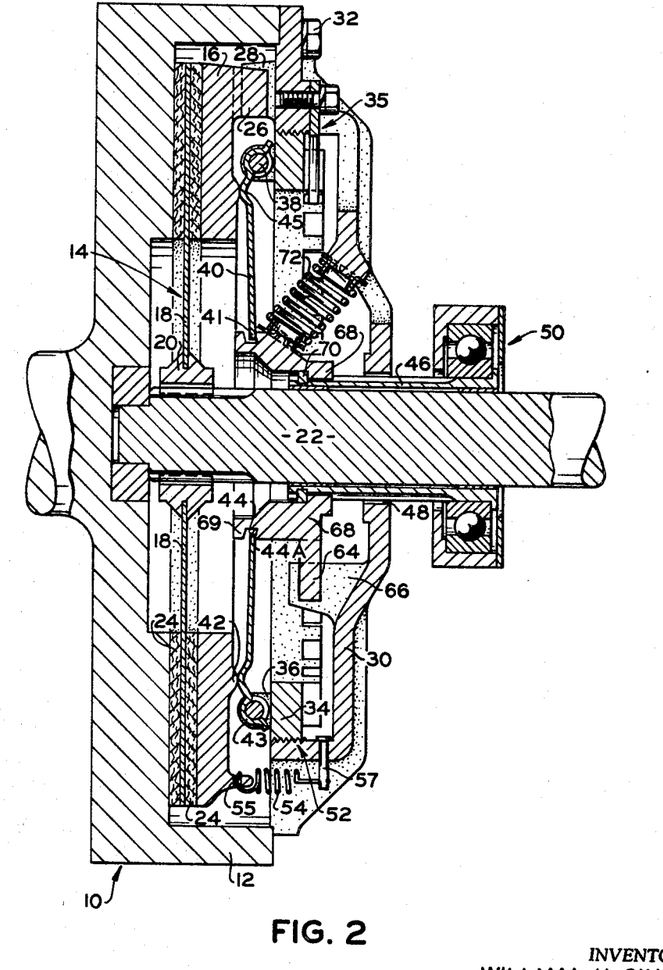
FIG. 2 is a sectional view taken substantially along lines 2—2 of FIG. 1 showing the clutch in an engaged position.

Referring to the drawings, particularly to FIGS. 1 and 2, a driving member in the form of a flywheel 10 of an internal combustion engine is provided with an axially extending rim 12 forming a cylindrical recess for receiving a driven disk assembly 14 and a pressure plate 16.

The driven disk assembly 14 comprises an annular plate 18 fixedly secured at its inner periphery to a hub 20 which is normally slidably splined on a driven shaft 22. The driven shaft 22 may be the input shaft of a transmission or other similar device. The annular plate 18 is provided at its outer periphery on both of its faces with conventional friction facing rings 24, 24. It is apparent then that the driven disk assembly 14 is axially movable relative to the flywheel 10 and is adapted to be pressed thereagainst by the pressure plate 16.

The pressure plate 16 is provided with axially outwardly extending driving lugs 26 on the back face thereof which cooperate with lugs 28 extending axially inwardly from a clutch cover 30 on each side of the lug 26 so that the clutch cover and pressure plate rotate in unison with the clutch cover 30 axially displaced from the pressure plate to permit relative axial movement therebetween. The clutch cover 30 is secured to the rim of the flywheel 10 by means of a plurality of circumferentially arranged cap screws 32.

Means is provided to move the pressure plate 16 axially to compress the driven disk assembly 14 against the flywheel 10. More particularly, the clutch cover 30 is provided with a conventional adjusting ring 34. The adjusting ring 34 is peripherally connected to a flange portion of the cover 30 by a threaded engagement shown generally at 52 so that circumferential movement of the ring 34 relative to the cover 30 results in axial movement of the ring 34 relative to the cover 30 and other related portions of the clutch.

Means, shown generally at 35, is provided to position the ring 34 against movement relative to the cover 30 and is constructed in accordance with the teachings of my United States Patent 3,176,814. The axially inwardly facing portion of the adjusting ring 34 is provided with a plurality of circumferentially spaced axially extending ears 36, which ears are conventionally disposed in a paired relationship. The ears 36 of each pair of ears are circumferentially spaced and securely receive in aligned openings therein a hinge pin 38 to provide a support for the hinge pin. Each of the pins 38 pivotally mounts a radially extending lever 40 near the outer end 43 of the lever, the levers being pivotally mounted on the portion of the pin disposed intermediate the pair of supporting ears, with the levers extending radially inwardly from the pin. The levers 40 have a detent 45 formed thereon adjacent the end 43, which detent projects to the left therefrom and engages an annular shoulder 42 formed on the rear face of the pressure plate 16. In this manner leftward movement of the radially inner end 41 of the levers 40 pivots the levers 40 about the pin 38 and presses the detent portion 45 of the lever against the shoulder 42 of the pressure plate 16 urging the pressure plate forwardly to press the driven member 14 into engagement with the flywheel 10.

Means is provided to urge the inner ends 41 of the clutch levers 40 axially. More particularly, a hollow release sleeve 46 is rotatably mounted on the driven shaft 22 for axial movement relative thereto. A throwout bearing 50 is secured to the right end of the sleeve 46 and is connected by a suitable linkage (not shown) to a foot pedal for inducing axial movement to the sleeve 46 in a well known manner. The release sleeve 46 rotatably extends through an aperture 48 in the center portion of the cover 30 and has splined to its left end a flanged lever retaining collar 68 which is secured against axial movement to the left relative thereto by an annular snap ring 70. The collar 68 is provided with three driving lugs, one being shown at 64, each cooperating with a pair of lugs, one of which is shown at 66. The lugs 66 are carried by and extend axially inwardly from the clutch cover 30 and abut the circumferentially opposed sides of the lug 64 so that the collar 68 rotates unitarily with the cover 30 while being axially movable relative thereto. The radially inner end 41 of the levers 40 are disposed in a peripheral annular groove 44 at the inner end 69 of the collar 68 and abuttingly engage the right side wall 44A of the groove while being spaced from the bottom of the groove.

A plurality of pairs of circumferentially spaced coiled compression springs 72 is compressed between the cover 30 and the collar 68. The springs urge the collar 68 and hence the inner ends 43 of the clutch levers 40 to the left, thereby biasing the pressure plate 16 towards the flywheel 10 to compress the members 14 therebetween. Movement of the release sleeve 46 to the right against the bias of the springs 72, pulls the inner ends of the levers to the right allowing the pressure plate 16 to be moved away from the flywheel 10 by a plurality of circumferentially spaced coiled tension return springs 54 (only one shown). Each of these small coil springs 54 is attached at one of its ends in an apertured boss 55 formed on the rear of the pressure plate 16 adjacent the periphery thereof and is secured at its other end to a pin 57 carried by the cover 30 and serve to withdraw the pressure plate 16 from the driven disk assembly 14 as the biasing force of the engaging springs 72 is overcome.

To release the clutch, a foot pedal (not shown) is operated to move the release sleeve 46 to the right against the bias of the coiled springs 72, and as the sleeve 46 moves to the right, the resilient load of the springs 72 is removed from the inner ends 43 of the levers 40 and, thus, from the pressure plate 16. When the load of the springs 72 on the pressure plate 16 is reduced sufficiently, the coiled tension springs 54 will commence to withdraw the pressure plate 16 from the driven member 14 and move the plate to the right; the springs 54, in withdrawing the pressure plate, maintain the shoulder 42 thereof in engagement with the detents 45 on the levers 40 and, thus, bias the inner ends 41 of the levers 40 to the right and maintain these inner ends in engagement with the right shoulder 44A of the groove 44.

The novel arrangement of the springs 72 and of the mounting and positioning means for the springs is shown in FIGS. 1–5. A plurality of springs 72 is arranged and spaced circumferentially and concentrically around the driven shaft and disposed between the movable lever retaining collar 68 and the clutch cover 30. The opposed ends of each of the springs 72 are cooperatively disposed on oppositely facing hollow mounting rings 74 and 76 securely attached to the collar 68 and the clutch cover 30, respectively, by being press fitted over annular projections 78, 78 formed on the collar and cover. The mounting rings 74 and 76 are generally of hat-shaped configuration, with an open ended cylindrical crown portion 75, into which the projections 78 are pressedly received, and a brim portion in the form of an annular flange 77 extending radially outwardly from the crown portion.

A pair of diametrically opposed pivots 79, which when viewed in cross section are of generally U-shaped configuration, are formed in each of the annular flanges 77 of the mounting rings 74 and 76, which pivots project upwardly from the flange 77 toward the end of the crown portion 75 remote from the projection 78, with the pivots of the mounting rings 74 and 76 engaging a given spring 72 generally projecting toward each other. A pair of detents 81 is formed on the collar 68 and on the cover 30 adjacent to each of the projections 78, which detents are cooperatively shaped and positioned so as to be received into the bottom of the pivots 79 to prevent the rings 74 and 76 from rotating about the projections 78.

The cylindrical crown portions 75 are pilotingly received in the open ends of the springs 72 and are of somewhat smaller external diameter than the least internal diameter of the portion of the spring surrounding the same, such internal diameter varying as the springs are compressed and expanded, so that no binding occurs therebetween and also so that upon angular movement of the spring relative to the cylindrical portion, no interference exists. The outer end faces of the action and reaction ends 80 and 82 of the springs 72 pivotally engage the upper surface of the pivots 79, whereby the pivots provide a fulcrum and, along with the action and reaction ends 80 and 82 of springs 72, form force transfer points for the compressive force of the spring utilized in urging the pressure plate 16 of the clutch toward engagement. The collar 68, in moving axially, moves in an axially straight path, so that the pivots 79 on the mounting ring 74 remain at a constant radial distance and the perpendicular distance remains constant between a line which extends axially and parallel to the rotational axis of the clutch and upon which the pivot 79 of the ring 76 lies and the line representing the loci of points occupied by the pivot 79 of the ring 74.

As illustrated, the spring 72 is mounted to extend angularly inwardly relative to the axial direction of the clutch, i.e., extends both radially inwardly and axially to the left from the clutch cover 30, so that compression of the spring provides radial and axial components of force that vary as the angle of the spring varies. The pivots 79 on the guide rings 74 and 76 are disposed so as to accommodate this variation in angle of the spring engaging the same, that is, the pivots 79 of the rings 74 are disposed generally chordally of an imaginary circle joining the action ends 80 of the springs 72 while the pivots 79 of the rings 76 are disposed generally chordally of an imaginary circle joining the reaction ends 82 of the springs. The spring ends 80 and 82 pivot during movement of the pressure plate 16 so as to always be parallel to each other and the U-shaped pivots 79 provide action and reaction load bearing means for the force of the spring 72 on the collar 68 and clutch cover 30, respectively, and the load bearing means of this embodiment move in parallel planes relative to the axial direction. Thus, while the axial distance between the pivots in variable the radial distance between the pivots 79 remains constant.

Figure 3:
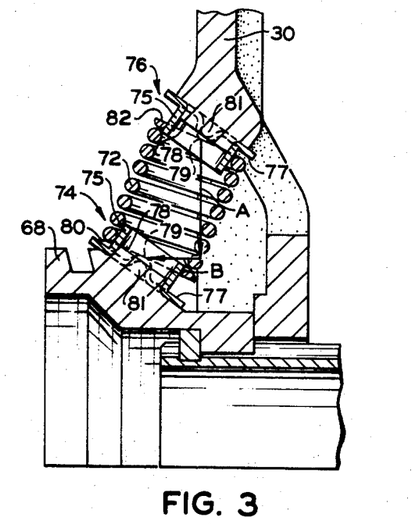
FIGS. 3–5 are enlarged views of portions of FIG. 2 showing the engaging springs and mounting means therefor in the released, engaged and wear compensated positions, respectively.
Figure 4:
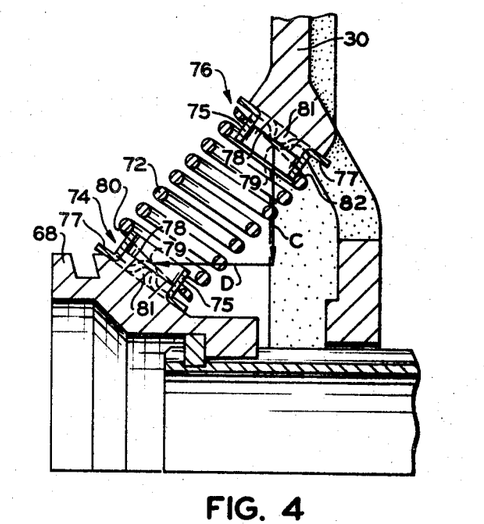
Figure 5:
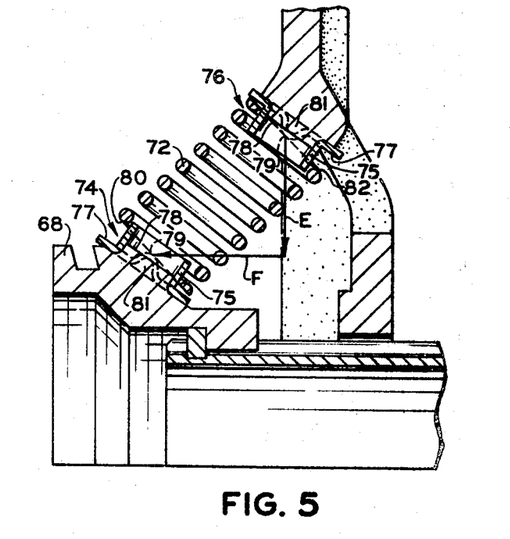

Turning to FIGS. 3 to 5, the spring and its mounting means are shown in enlarged view with the compressive force of the spring broken down, and indicated diagrammatically, into its radially directed component vectors A, C and E and its axially directed component vectors B, D and F, to represent the release, new engaged and wear compensated positions respectively. These vectors were drawn assuming that a constant urging force was exerted by the spring, and graphically show the effect of the novel spring arrangement and mounting of the invention. As can be seen, the axially directed vector's magnitude continually increases in going from the full release, to the full engaged and to the wear compensated positions (compare, for example, vectors B, D and F). When the clutch moves from the release position to the wear compensated position the spring 72 pivots on the pivots 79, 79 to provide a substantially direct line of force between the pivots, which line sweeps through a decreasing angle with respect to the axial component of force. The axially extending vector of the spring force increases as the angle decreases to compensate for the actual decreasing compressive force provided by the less compressed spring 72.

Figure 6:
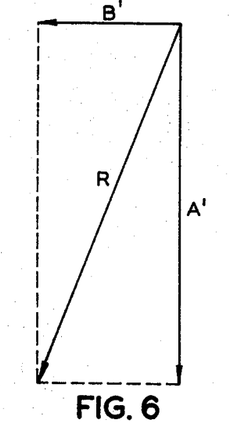
FIGS. 6 and 7 are force diagrams of the engaging springs of the embodiment of FIGS. 1–5 in a fully released and new engaged position, respectively.
Figure 7:
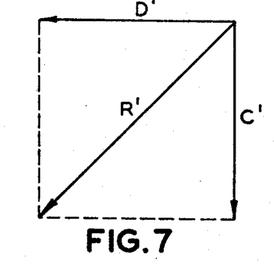

Typical force diagrams of the clutching force provided by the spring arrangement and mounting means of the invention are shown in FIGS. 6 and 7 and are illustrative of the foregoing principle. These diagrams show the actual force exerted by a single spring in the full release (FIG. 6) and in the new engaged position (FIG. 7), the resultant spring force acting between the pivots 79, 79 being represented by the vectors R and $R_1$, respectively. The axial vectors B' and D' illustrate the actual force exerted by this spring 72 on the levers 40, which levers in turn multiply this force and apply the same on the pressure plate. The vectors show an increasing axial force from B' to D', i.e., from the released to the engaged position, while the actual compressive force of the spring, compare vectors R and $R_1$, is decreasing. This is contrary to the conventional spring load clutch wherein the force available from the springs and the load on the release bearing both decrease as the clutch moves into engagement and both increase as the clutch moves toward disengagement. Thus, the spring 72 in the full released position of FIG. 6 shows a decreased axial force B', when compared to the axial force D' of the engaged position of FIG. 7, even though the actual force vector R is larger in magnitude than the actual force vector $R_1$, indicating that the release bearing load is less at the full released position than it is when the release bearing arrives at the engaged position, resulting in easy declutching.

Figure 8:
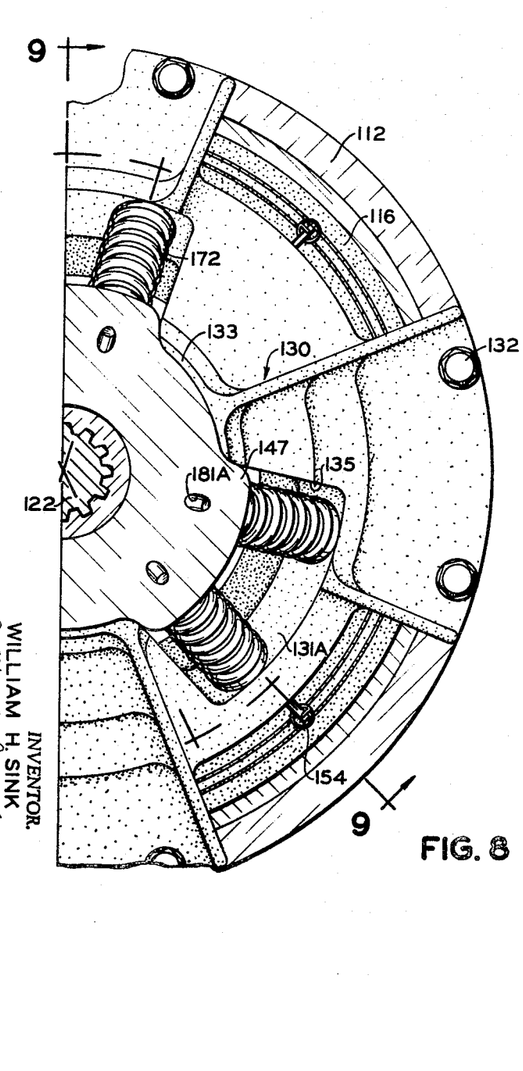
FIG. 8 is an end elevational view of a portion of another embodiment of the present invention.
Figure 9:
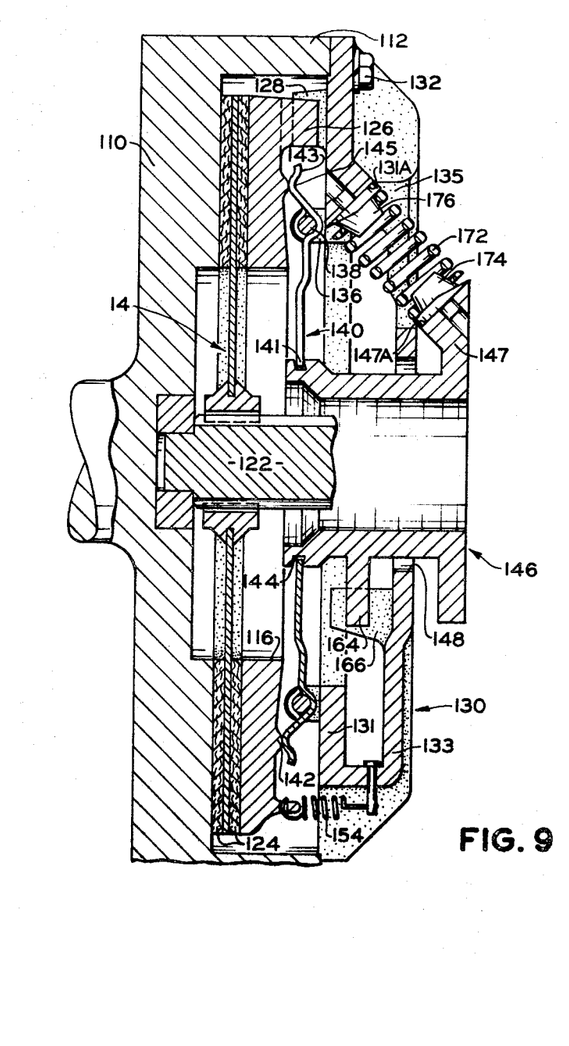
FIG. 9 is a sectional view taken on lines 9—9 of FIG. 8.
Figure 10:
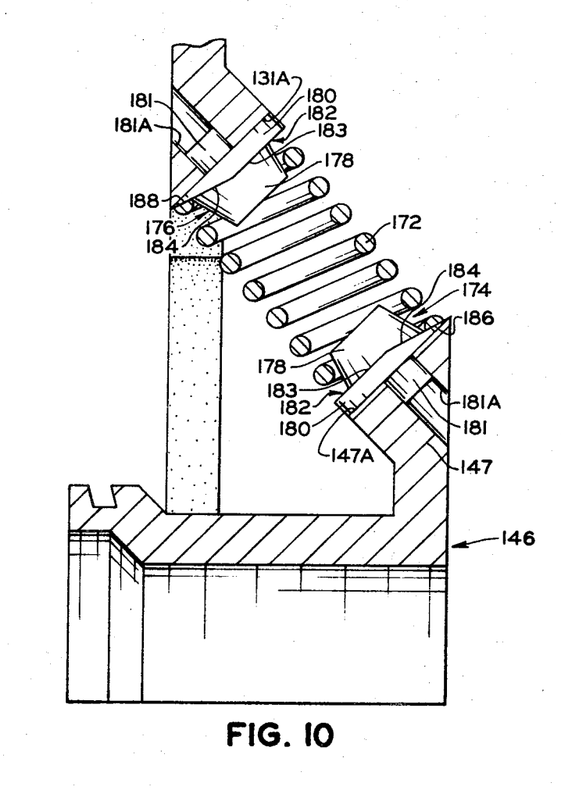
FIG. 10 is an enlarged view of a portion of FIG. 9 showing the urging spring in its compressed position.

In the second embodiment of the invention, and now referring particularly to FIGS. 8–10, a driving member in the form of a flywheel 110 has a cylindrical recess for receiving a driven disk assembly 114 and a pressure plate 116. As in the embodiment of FIGS. 1–5, the driven disk assembly 114 carries friction facing rings 124, 124 and is adapted to be compressed between the pressure plate 116 and the flywheel 110 so as to be operative to transmit torque to a driven shaft 122 to which the disk assembly is splined. The pressure plate 116 is provided with axially outwardly extending driving lugs 126 on its back face which cooperate with a lug 128 disposed on each circumferential side of each of the lugs 126 and extending inwardly from a clutch cover 130, secured to the flywheel 110 by cap screws 132, so that pressure plate, clutch cover and flywheel rotate in unison, while the pressure plate is axially movable relative to the flywheel and cover.

Means is provided to move the pressure plate 116 axially to compress the driven disk assembly 114 against the flywheel 110. More particularly, the clutch cover 130 includes a plurality of pairs of radially and axially inwardly extending ears 136; the ears of each pair of ears being circumferentially spaced and supportingly receive in aligned openings therein a pivot pin 138; the ears 136 being formed on a flange 131 formed on the cover 130, which flange extends radially inwardly from the periphery of the cover and is spaced axially to the left of the outer portion 133 of the cover. Each of the plurality of radially extending levers 140 is pivotally mounted on a pivot pin 138 at a position closer to its radially outer end 143 than to its radially inner end 141, and a lever detent 145, projecting to the left from each of the levers, engages an annular shoulder 142 formed on the right face of the pressure plate 116 and positioned radially outwardly from the pivot pin. In this manner rightward movement of the inner end 141 of the levers 140 pivots the levers and presses the detents 145 of the levers against the shoulder 142 of the pressure plate 116 to urge it to the left to press the disk assembly 114 into engagement with the flywheel 110.

Axially movable means is provided to urge the inner ends of the clutch lever to the left and includes a hollow release sleeve 146 rotatably mounted on the driven shaft 122 for axial movement relative thereto. A throwout bearing (not shown) is connectable to the sleeve 146 and manipulated by well known linkage means (not shown) for inducing leftward axial movement of the sleeve. A central, axially extending aperture 148 is provided in the portion 133 of the clutch cover 130 to permit the release sleeve 146 to rotatably extend axially therethrough, and the sleeve is provided with a radially extended driving lug 164 which cooperates with a pair of circumferentially spaced lugs 166 extending axially outward from the clutch cover 130 to circumferentially abut the lug 164 so that the sleeve is axially movable relative the cover and rotates in unison therewith. The inner ends 141 of levers 140 are disposed in an annular groove 144 formed in the sleeve adjacent the left end thereof. The sleeve 146 has an annular flange 147 projecting radially outwardly from the right end thereof at a position spaced to the right of the cover 130, and a plurality of coiled compression springs 172 are disposed between the cover 130 and the flange 147 to urge the sleeve 146 and the inner ends 141 of the clutch levers 140 to the right so that the outer ends 143 of the levers move to the left and push the pressure plate 116 towards the flywheel 110 and into its engaged position. Leftward or releasing movement of the release sleeve 146 by the release bearing (not shown) against the bias of the springs 172 moves the radially inner ends 141 of the levers 140 to the left and the outer ends 143 to the right and allows the pressure plate 116 to be disengagingly moved away from the flywheel by a plurality of return springs 154. It is to be understood that this embodiment of the invention as well as the later described embodiments can also be provided with a conventional adjusting ring and locking means therefor in a manner similar to that shown in the embodiment of FIGS. 1 and 2.

As in the first embodiment of the invention, the springs 172 are disposed in an angular direction relative to the axial direction of the clutch. More particularly, the springs 172 extend both radially inwardly and axially to the right from the flange 131 of the clutch cover 130 and through openings 135 in the outer portion 133 of the cover and are arranged concentrically; however, the springs 172 are seen to be disposed at an angle 90° displaced from the angle of the springs 72 of the first embodiment (a pull type clutch) to provide for pressure engagement in a push type clutch. The axial and radial spring force components provided by the springs 172 of this embodiment of FIGS. 8–10 are the same as the force components of the springs 72 described in the embodiment of FIGS. 1–7. Thus, a push type clutch of the character described having automatic compensation for wear and lowered declutching pressure is obtained.

Each of the springs 172 is arranged on oppositely facing lugs 174 and 176 fixedly attached to parallel surfaces 147A and 131A provided on the flange 147 and on the flange 131 of the clutch cover 130 respectively, the surface 147A being adapted to move axially relative to the surface 131A as the sleeve 146 moves axially, with the surfaces 147A and 131A remaining parallel and of constant radial spacing as the axial distance varies therebetween. Each of the lugs 174 and 176 includes a truncated conical portion 178 extending axially and pilotingly into the opening within the spring 172 and the periphery of the conical portion is spaced from the internal diameter of the spring to allow the spring to move angularly relative thereto. The lugs 174 and 176 terminate at their ends, opposite to the conical portions, in an annular base portion 180 which rests on the surface 147A of the flange 147 and on the surface 131A of the cover 130 and are secured thereto by a trunnion 181 formed on the base portion and pressed into a bore 181A formed in the flange and cover.

Each of the base portions 180 is formed with an upper spring contacting surface, shown generally at 182, the upper surface being comprised of a flat surface portion 183 which is parallel to the surface 147A and 131A and an angularly disposed surface portion 184 which merges with the surface 183 and is inclined therefrom toward the periphery of the base 180 at the surface 147A or 131A carrying the same. The angularly disposed surfaces 184 of the lugs 174 and 176 are positioned on diametrically opposed portions, respectively, of the base 180 carrying the same. The base portion 180, against which the loads of the action and reaction ends 186 and 188 of the spring 172 are imposed, from the force transfer points for the compressive force of the spring utilized in urging the clutch to an engaged position.

As the clutch moves from its engaged (FIG. 9) to its disengaged position (FIG. 10), the spring ends 186 and 188 move in a parallel manner and pivot about the merger of the surfaces 183 and 184 and finally about against the surface 184 of the lugs to provide a direct line of clutching force which sweeps through an increasing angle with respect to the axis of the clutch, the axially extending vector of this angle decreasing as the angle increases to thereby compensate for the actual increasing force of the spring in a manner similar to the embodiment of FIGS. 1–7. When the clutch moves from a disengaged to an engaged position, the spring ends 186 and 188 pivot about the merger of surfaces 183 and 184 and finally abut against the surface 183; the line of spring force sweeping through a decreasing angle and the axially extending vector of this angle increasing to compensate for the decreasing force of the spring 172.

Figure 11:
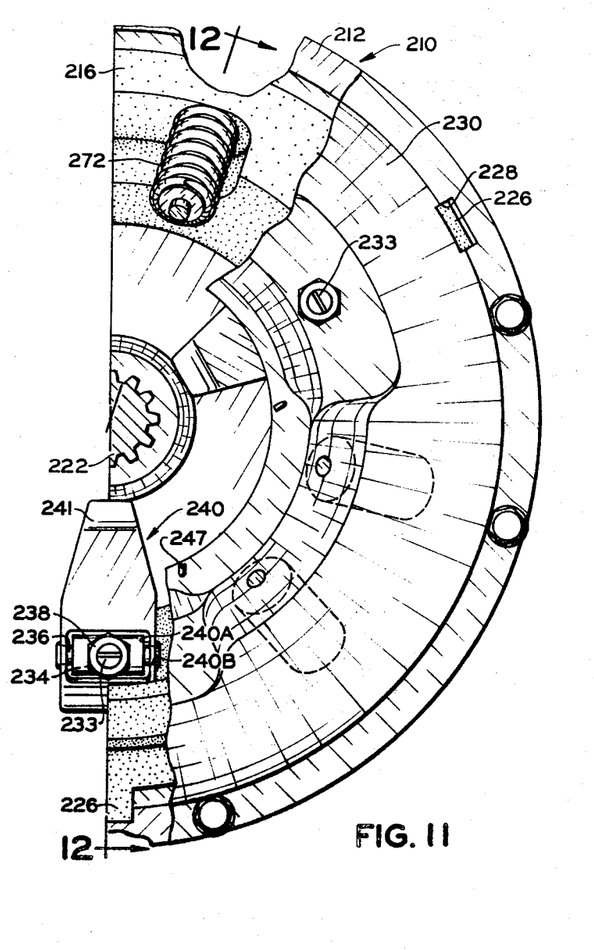
FIG. 11 is an end elevational view of a portion of another clutch embodying the present invention with portions of the clutch broken away for added clarity.
Figure 12:
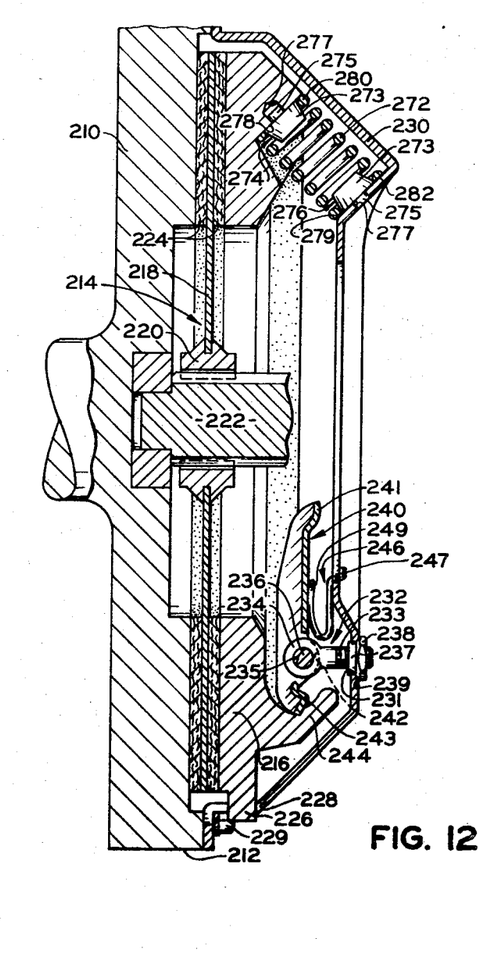
FIG. 12 is a view of the clutch of FIG. 11 when the same is seen in a section taken on lines 12—12 of FIG. 11.
Figure 13:
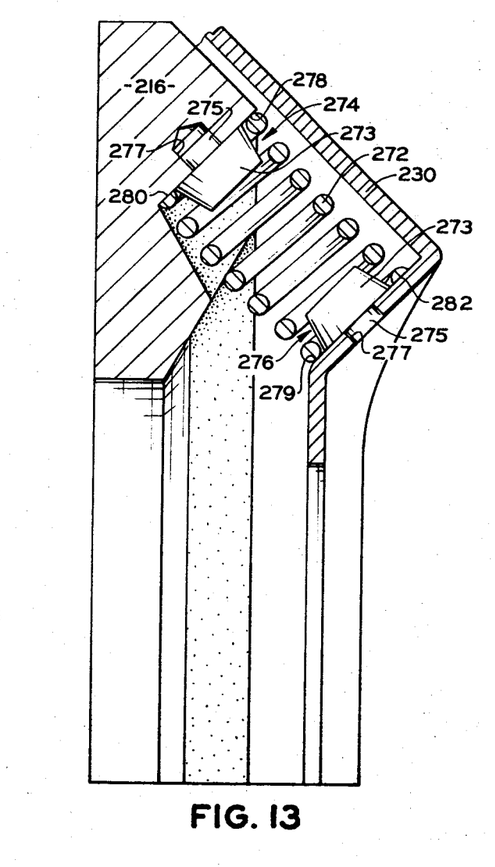
FIG. 13 is an enlarged view of a portion of FIG. 12 showing the urging spring in its compressed position.

In the third embodiment of this invention, and referring more particularly to FIGS. 11–13, there is provided a driving member in the form of a flywheel 210 with an axially extending rim 212 forming a cylindrical recess receiving a driven disk 214, and a pressure plate 216 is spaced from the flywheel and operable to press the disk against the flywheel. The driven disk assembly 214 comprises an annular plate 218 fixedly secured at its inner periphery to a hub 220 that is slidably splined on a driven shaft 222. The annular plate 218 is provided at its outer periphery on both of its faces with conventional friction rings 224 and as in the previous embodiments, is axially movable on the shaft 222 and pressed against the flywheel 210 by the pressure plate 216 as the clutch is engaged.

The pressure plate 216 is provided with radially extending driving lugs 226 on the periphery thereof which cooperate with slots 228 extending radially in a clutch cover 230 so that the clutch cover 230 and pressure plate 216 rotate in unison; the slots 228 being axially enlarged and spaced from the lugs 226 so that the pressure plate can move axially relative to the cover. The clutch cover 230 is secured to the rim of the flywheel 210 by means of a plurality of circumferentially arranged cap screws 229 and overlies and is axially spaced from the pressure plate.

Disengaging means is provided to urge the pressure plate 216 axially to disengage the driven disk assembly 214 from the flywheel 210. More particularly, the clutch cover 230, which forms a part of the disengaging means, is provided with a series of circumferentially spaced openings 231 in each of which is received an ear 232 comprised of a threaded shank portion 233 projecting through the opening 231 and extending to the left of the cover 230 and an enlarged boss portion 234 formed on the left end of the shank and spaced to the right from the pressure plate 216. Each boss 234 is elongated generally in a direction chordally with respect to the pressure plate and has an elongated opening 235 therethrough for pressedly receiving a pivot pin 236. The ear 232 is inhibited from moving to the left relative to the cover 230 by a nut 238 threaded onto the shank 233 and having an enlarged head with a tapered undersurface 239 and a cylindrical neck 237. The neck 237 is received in the opening 231 while the tapered undersurface 239 engages the right side of the cover. Accordingly, the amount which the boss 234 projects to the left of the cover 230 can be adjusted by manipulation of the nut 238.

The pivot pin 236 projects from both of the ends of the boss 234, and the ends are pivotally received in a pair of aligned openings 240B (see FIG. 11) in a channel shaped lever 240; the outer ends of the pins being peened over to retain the lever thereon. The lever 240 has an opening 240A in which the boss 234 is received, and the lever extends radially inwardly and outwardly of the pin 236 with the radially inner end 241 thereof adapted to be conventionally engaged on the right side thereof by a suitable push type throwout bearing (not shown) for urging the inner end 241 to the left and disengaging the clutch. The radially outer end 243 of the lever 240 is disposed under a shoulder 242 formed on the left side of a boss 244 projecting to the right and radially inwardly from the right face of the pressure plate 216 so that as the inner end of the lever 240 moves to the left and the right end thereof moves to the right, the right end will move the pressure plate to the right and toward its disengaged position. A plurality of suitable spring means in the form of V-shaped spring clips 246 is provided with a clip associated with each lever 240. Each clip has its right end 247 secured in an opening, the cover 230 and its left end 249 engaging the right side of the lever 240 associated therewith at a position radially inwardly from the pin 236 so as to press the inner end of the lever to the left. Thus, in the engaged position of the pressure plate 216 and the levers 240, the spring clips 246 maintain the outer ends 243 of the levers in resilient engagement with the shoulder 242 thereby functioning as an anti-rattle device.

Means is provided to urge the pressure plate 216 axially to the left to compress the driven disk assembly 214 against the flywheel 210. Specifically, a plurality of circumferentially spaced, coiled compression springs 272 is compressed between the cover 230 and the pressure plate 216. The springs extend radially outwardly and axially to the left from the cover 230 into engagement with the pressure plate 216 to urge the pressure plate towards the flywheel 210 and thereby compress the member 214 therebetween. Each of the springs 272 at its action end 280 bears against a flat seat 278 on the pressure plate 216, which seat, in the engaged position shown in FIG. 12, is preferably formed at right angles to the axis of the spring and forms the action load bearing means for the spring. The spring 272 at its reaction end 282 bears against a flat seat 279 on the clutch cover 230, which seat, in the engaged position shown in FIG. 12, is preferably formed at right angles to the axis of the spring and forms the reaction load bearing means for the spring. The seats 278 and 279 are thus preferably parallel and aligned with each other and, as the pressure plate 216 moves relative to the cover 230, the seat 278 moves in a path parallel to the seat 279 so that the radial distance therebetween remains constant while the axial distance therebetween varies. A pair of opposite facing lugs 274 and 276 are secured centrally in each of the seats 278 and 279 respectively of the pressure plate 216 and clutch cover 230, respectively. The lugs 274 and 276 each include a truncated conical portion 273 extending axially into the spring with the portion 273 having its enlarged base engaging the seat 278 or 279; the enlarged base having a diameter substantially the same as the internal diameter of the spring, and its outer end opposite the base having a diameter smaller than the internal diameter of the spring. The lugs 274 and 276 also include a trunnion 275 which is pressedly secured in a bore 277 carried by the pressure plate 216 and cover 230, which bores are formed centrally in the seats 278 and 279.

As the pressure plate 216 is moved to the right against the biasing effect of the springs 272 by the manipulation of the levers 240, the action and reaction ends 280 and 282 of each of the springs remain in full engagement with the seats 278 and 279 respectively and move in parallel, radially equidistant paths while axially approaching each other. While in the previously described embodiments the ends of the springs pivoted relative to the action and reaction load bearings means, in the instant embodiment, the ends 280 and 282 do not pivot relative to the seats 278 and 279; however, they do remain parallel. Since the springs 272 do not pivot, they assume the slightly bowed shape shown in FIG. 13 as the pressure plate moves to its disengaged position, so that the axis of the spring is no longer straight as in the engaged position of FIG. 12, but rather, the axis is bent.

Although the bendingly deforming of the spring while compressing the same as the pressure plate moves toward disengagement requires a somewhat greater disengaging force from the levers 240, the additional amount of force is negligible. It should be understood that the seats 278 and 279 can be aligned in the disengaged position so that the spring axis is straight in the disengaged position and bent in the engaged position. Even with the bending of the axis of the spring 272, a direct line of force acts between the seats 278 and 279, which force is of substantially the same magnitude as provided in the embodiments previously discussed herein. Furthermore, the angular relationship of the spring 272 resulting in the desirous variation in the axial and radial vectors of the springs is also substantially the same as described with respect to the previous embodiments.

Figure 14:
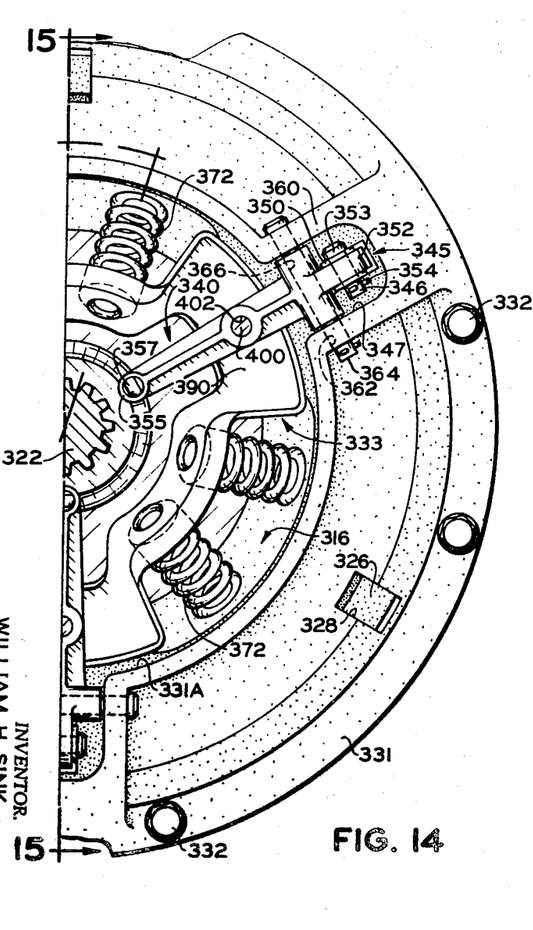
FIG. 14 shows an end view of a portion of a further embodiment of the invention.
Figure 15:
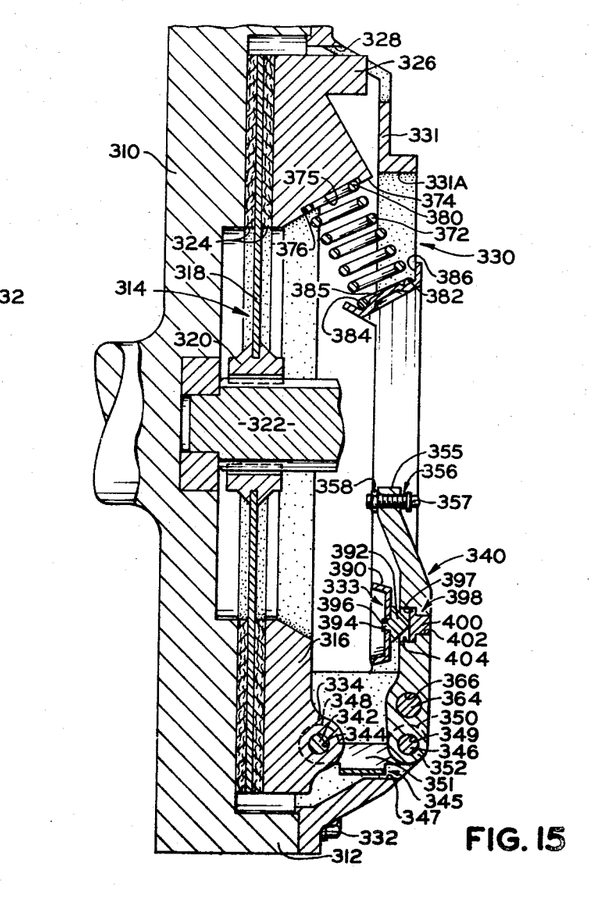
FIG. 15 is a sectional view taken on line 15—15 of FIG. 14.
Figure 16:
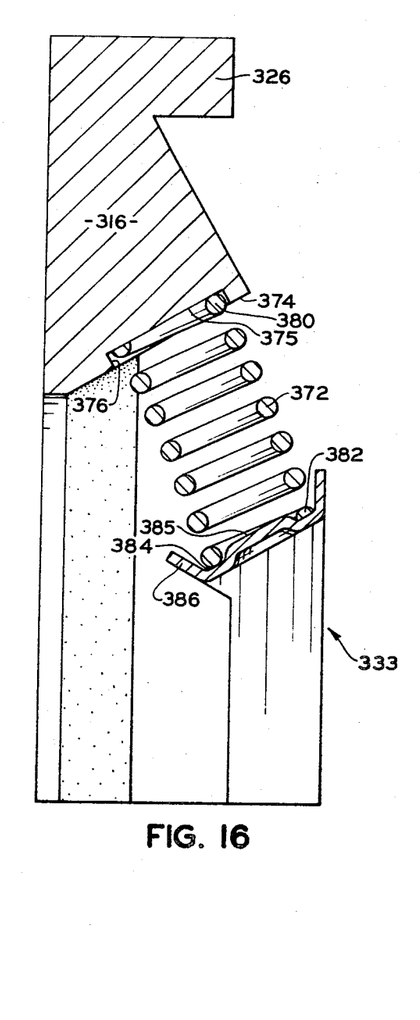
FIG. 16 is an enlarged view of a portion of FIG. 15 showing the spring in its compressed position.

In a fourth embodiment of this invention, as seen in FIGS. 14-16, there is shown a driving member in the form of a flywheel 310 provided with an axially extending rim 312 forming a cylindrical recess for receiving a driven disk assembly 314 and a pressure plate 316. The driven disk assembly 314 comprises an annular plate 318 fixedly secured at its inner periphery to a hub 320 that is slidably splined on a driven shaft 322 which may be the input shaft of a transmission or similar device. The annular plate 318 is provided at its outer periphery, on both faces thereof, with conventional friction facing rings 324. The driven disk assembly 314 is axially movable relative to flywheel 310 and is adapted for pressing engagement thereagainst by the pressure plate 316.

A cover 330 comprises an annular fixed cover portion 331 which is peripherally secured to the rim 312 of the flywheel 310 by a plurality of circumferentially spaced cap screws 332, and a movable cover portion 333 coaxial with and axially movable relative to the fixed cover portion and disposed in a large central opening 331A in the fixed cover portion. The fixed cover portion 331 and the movable cover portion 333, which comprise the cover 330, are spaced axially to the right of the pressure plate 316 and the latter is provided with a plurality of circumferentially spaced driving lugs 326 which extend to the right therefrom at a position adjacent the periphery thereof and project into and cooperate with the slots 328 extending through the fixed cover portion 331. The lugs 326 circumferentially engage the slots 328 so that the cover 330 and the pressure plate 316 rotate unitarily while the pressure plate can move axially relative to the cover.

Means is provided to move the pressure plate 316 axially to the right from its engaged position, shown in FIG. 15, to disengage the pressure plate from the driven disk 314 so that the latter is not compressed between the pressure plate and the flywheel 310. More particularly, the pressure plate 316 includes a series of circumferentially spaced lugs 334 extending axially to the right therefrom and positioned intermediate the lugs 326. Each of the lugs 334 pivotally receives a link pin 342 passing through a bore 344 formed in the lug and extending generally chordally with respect to the pressure plate 316. An actuating link 345 is pivotally mounted at its left end to each of the link pins 342 and extends axially to the right therefrom through one of a plurality of slots 347 formed in the fixed cover 331; the link 345 being pivotally mounted at its right end to a second link pin 346 pivotally mounted in a bore 349 of one of a plurality of levers 340.

Each link 345 has an intermediate body portion 351 of general channel shaped configuration and terminates at its left and right ends in bifurcations 348 and 350, respectively. The bifurcations 348 and 350 are disposed on circumferentially opposed sides of the lugs 334 and the radially outer end 352 of the lever 340, respectively, and are provided with aligned openings therein for pivotally receiving the outer ends of the link pins 342 and 346 respectively. As seen in FIG. 14, the pin 346 is provided with an enlarged head 353 at one end thereof and a cotter pin 354 conventionally passes through the other end thereof to prevent the pin from moving along its axis relative to the bifurcation 350. The pin 342 is secured relative to the bifurcation 348 in a like manner.

Each lever 340 extends radially inwardly from its outer end 352 and terminates in an inner end 355 through which is threaded an axially extending adjusting screw 356, the head 357 thereof facing the right and carrying a jam nut 358 on the portion thereof to the left of the lever for securing the axial position of the screw relative to the lever 340. The fixed cover portion 331 is provided with a pair of bosses 360 for each slot 347, a boss being disposed on each circumferential side of the slot, which pair of bosses have aligned openings 362 therein extending generally chordally of the cover portion 331. A pivot pin 364 is disposed in the aligned openings 362 and pivotally passes through an opening 366 in the portion of the lever 340 disposed in the slot 347; the opening 366 being formed in a chordally enlarged portion the lever slightly radially inwardly of the outer end 352 thereof. Accordingly, leftward movement of the inner end 354 of the levers 340, as seen in FIG. 15, by suitable means, such as a throw-out bearing (not shown) pressing on the head 357 of the screw 356, will move the radially outer end 352 of the levers to the right and, through the links 345, move the pressure plate 316 axially to the right away from engagement with the driven disk 314.

Means is provided to urge the pressure plate 316 to the left and into engagement with the driven disk 314. More particularly, a plurality of resilient means in the form of coil springs 372 is disposed between the pressure plate 316 and the movable cover portion 333 of the cover 330. At a plurality of circumferentially spaced locations, the pressure plate 316 is provided with surfaces 374, which surfaces slope angularly to the right and radially outwardly as viewed in FIGS. 15 and 16, and circular depressions 376 are formed in the surfaces 374, with each depression receiving the left or action end 380 of a coil spring 372 and engaging the same with an abutting surface 375 forming the bottom of the depression 376.

The springs 372 extend angularly to the right and radially inwardly of the depressions so that their right or reaction ends 382 abuttingly engage the movable cover portion 333. At the location of such spring engagement, the cover portion 333, which is of general channel-shaped cross sectional configuration, is deformed angularly so as to present abutting surfaces 384; each such surface is sloped angularly to be parallel to the surface 374 on the pressure plate 316 abutting the action end of the spring 374 whose reaction end engages the particular surface 384. The sides 386, forming the channel-shape of the portion 333, are inclined angularly outwardly from the surfaces 384 so that, at their junction with the surface 384, the sides 386 are closely spaced from the end 382 of the spring 372, while at their outer ends, the sides are widely spaced from the spring. At the location of the spring 372, the surface 384 is provided with a projection 385 extending into the last coil of the reaction end of spring 372 so that the projection 385 and the sides 386 pilot the reaction end 382 of the spring.

As seen in FIG. 14, at circumferentially spaced locations, intermediate the abutting surfaces 384, the movable cover portion 333 is provided with U-shaped segments 390 extending radially outwardly from the remainder of the movable cover which carries the abutting surfaces, with a U-shaped segment being disposed to the left, see FIG. 15, of each lever 340. A conically shaped wear insert 392 is secured to each segment 390 by having a trunnion 394 on the base thereof pressedly secured in an opening 396 formed in the segment 390; the apex of the insert extending axially to the right and pivotally abutting an enlarged end 397 of a wear insert 398 secured to the lever 340. The cylindrical body 400 of the insert 398 is pressedly received in a bore 402, while the end 397 is received in a counterbore 404, which bores are formed in the lever 340 at a position intermediate the pivot pin 364 and the inner end 355 of the lever.

Accordingly, the reaction loads of the springs 372 which are collectively imposed on the movable cover portion 333, the latter functioning as a portion of the reaction means, are imposed by the movable cover portion on the lever 340 at a location radially inwardly of the pivot pin 364 and urge the radially inner end of the levers to the right; the fixed portion 331 of the cover 330 functioning as the stationary portion of the reaction means for this reaction load. The outer ends 352 of the levers 340 are urged to the left by this reaction load, which is now in effect an action load, and, through the links 345 imposes this load on the pressure plate 316 thereby urging the latter to the left forward its engaged position.

In the operation of this embodiment, as the inner ends 355 of the levers 340 are urged to the left to disengage the clutch, that is, to move the pressure plate against the load of the springs 372 from its engaged position shown in FIG. 15 to its disengaged position shown in FIG. 16 wherein the pressure plate is spaced from the driven disk 314, the abutting surfaces 375 and 384, formed on the pressure plate and movable cover member 333, axially approach each other while remaining in a parallel relationship and at a constant radial distance, so that the angular relationship of the springs 372 resulting in the desirous variation in the axial and radial vectors thereof is substantially the same as described with respect to the previous embodiments. It should be noted that not only is the axial vector of the action load of the spring reduced as the pressure plate moves towards disengagement, but also the axial vector of the reaction load of the spring is reduced; such reaction load being redirected by the levers 340 and imposed on the pressure plate as an action load. As noted in FIG. 16, the springs 372 of this embodiment remain in full engagement with the abutting surfaces 375 and 384 as the abutting surfaces move in parallel, radially equidistant paths while moving axially relative to each other and, as in the embodiment of FIGS. 11–13, the action and reaction ends 380 and 382 of the spring 372 do not pivot relative to the surfaces 375 and 384. Since the springs 372 do not pivot, they assume the slightly bowed shape shown in FIG. 16 as the pressure plate moves to its disengaged position, so that the axis of the spring is no longer straight as it is in the engaged position of FIG. 15, but rather, the axis is bent. It should be understood that the surfaces 375 and 386 can be aligned in the disengaged position so that the spring axis is then straight and becomes bent in the engaged position. Even with the bending of the axis of the springs 372, a direct line of force acts between the surfaces 375 and 386. It should also be noted that in this embodiment, as well as in the embodiment of FIGS. 11–13, a pivotal type spring seat can be provided for the action and reaction ends of the springs.

Figure 17:
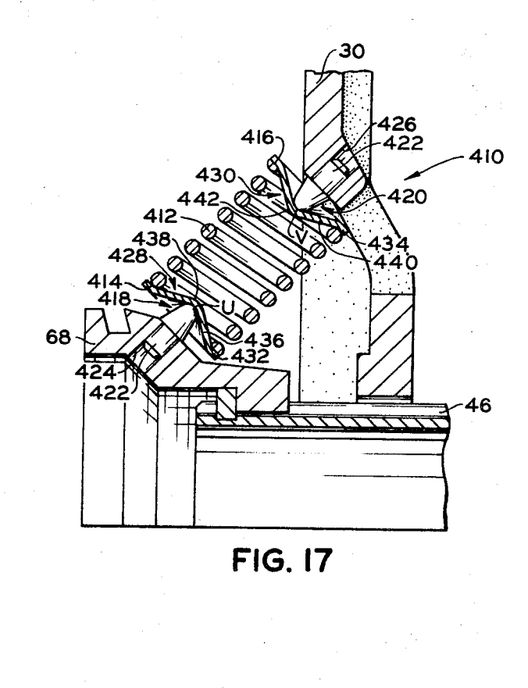
FIG. 17 is an enlarged view of an engaging spring and seat therefor which may be utilized in this invention.

Referring now to FIG. 17, a portion of a clutch is shown at 410 and is of the same general type as the clutch shown in FIGS. 1–5; the collar 68 being movable by the release sleeve 46 from the engaged position, shown in FIG. 17, axially to the right to a disengaged position, while a plurality of springs, one of which is shown at 412, biases the collar axially to the left to its engaged position. The collar 68, in moving between its positions controls the movement of levers which operate the pressure plate of the clutch (not shown in FIG. 17). More particularly, the spring 412 acts between the collar 68 and the cover 30 and has action and reaction ends 414 and 416 acting respectively against generally conically shaped action and reaction pivots 418 and 420 respectively, which pivots are carried by the collar 68 and the cover 30, respectively, and positioned such that the axis of the spring 412 is inclined axially to the right and radially outward with respect to the collar 68. The pivots 418 and 420 have an apex, indicated at U and V, respectively, which are formed generally as portions of a sphere, and the base of each of the pivots is formed with a trunnion 422 which is pressedly secured in bores 424 and 426 formed in the collar 68 and cover 30 respectively; the conjoint axes of the apexes U and V lying on the axis of the spring 412. The pivots 418 and 420 are shown as being coaxial in the engaged position of FIG. 17; however, the same may be displaced from being coaxial at this time while still obtaining the desired vectoral change of the spring 412.

Both the action and reaction ends 414 and 416 of the spring 412 are provided with a generally conical spring seat 428 and 430 respectively, which spring seats have a peripheral flange 432 and 434 respectively. The flange 432 engages the action end 414 of the spring 412 with the conical portion 436 of the spring seat 428 extending axially into the spring 412, that is, the conical portion is disposed concavely with respect to the pivot 418, and the apex U of the pivot 418 engages the apex 438; the apex 438 being of a shape which complements the apex U.

The flange 434 of the spring seat 430 engages the reaction end 416 of the spring 412 and the conical portion 440 thereof extends axially into the spring 412 such that the conical portion 440 is positioned concavely with respect to the pivot 420. The apex V of the pivot 420 engages the apex 442 of the seat 430; the apex 442 being of a form which is the complement of the apex V.

Figure 18:
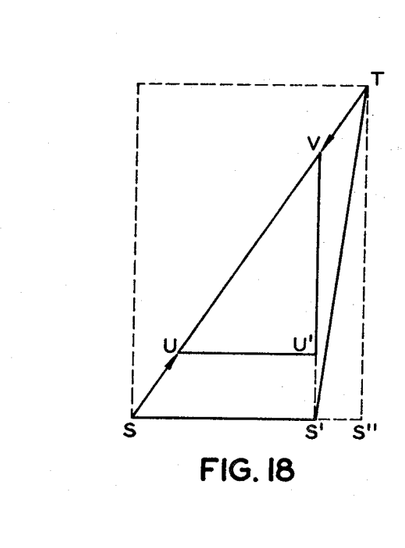
FIG. 18 is a diagrammatic view of the spring and seating arrangement shown in FIG. 17.

Referring now to FIG. 18 in conjunction with FIG. 17, a diagrammatic view is shown comparing the action of the embodiment shown in FIG. 18 with that of the embodiment shown in FIGS. 1–5. The line S—T, upon which the points U and V lie, represents the axis of both the spring 412 of FIG. 17 and the spring 72 of FIGS. 1–5 when the same is in the engaged position; the points S and T representing not only the action and reaction ends of both of the springs, but also the pivots 79, 79 carried by the collar 68 and cover 30 of the embodiment of FIGS. 1–5. The points U and V represent the apexes U and V on the pivots 418 and 420, respectively, of the embodiment of FIG. 17 and are shown in their actual position as disposed axially inwardly from the ends of the spring 412.

The line S—S' represents the axial movement of the pivot 79 on the collar 68 as the same moves from its engaged to its disengaged position, the line S'—S" is an extension of the line S—S', the line T—S' represents the axis of the spring in the disengaged position and the point S' represents the position of the pivot 79 on the collar 68 in the disengaged position. The line U—V represents the conjoint axes of the pivots 418 and 420, the distance between the points U and V being the distance between the apexes U and V in the engaged position. The line U—U' represents the axially straight path of the apex U as the clutch collar 68 moves the distance from the point S to S', the apex U being at the position indicated at U' when the pivot 79 on the collar 68 is at the position S'. The line V—U' represents the conjoint axes of the apexes U and V, and also the distance therebetween, when the same are in the disengaged position, and also represents the axis of the spring 412 of FIG. 17 in such disengaged position.

In the embodiment of FIGS. 1–5, as the spring 72 moves from its engaged to its disengaged position its axes moves from the position shown by the line T—S to the position shown by the line T—S' so that its angular relationship with respect to the axial direction changes from angle TSS' to angle TS'S", whereas, in the embodiment of FIG. 17, as the spring moves from its engaged to its disengaged position its axis changes from a position indicated by the line T—S to a position indicated by the line V—U' so that its angular relationship with respect to the axial direction changes from angle VUU' (the same as angle TSS') to right angle VU'U. In the embodiment of FIGS. 1–5, for the axis of the spring 72 to assume a right angle with respect to the axial direction, the pivot 79 would have to move from the position indicated at S to the position indicated at S", and the distance S—S" is substantially greater than the distance S—S'; the collar 68 of FIG. 17 only having to move the distance S—S' for the pivot U to move to the position U' so that the spring 412 assumes such a right angle.

Accordingly, it is seen that for the same amount of axial displacement of the collar 68 in moving from its engaged to its disengaged position, a much greater angular increase and accompanying decreasing axial force vector of the springs is realized by utilizing the pivots 418 and 420 and seats 428 and 430 of the embodiment of FIG. 17 than by utilizing the pivots 79 of FIGS. 1–5. Likewise, such angle in the device of FIG. 17 decreases more rapidly than in the device of FIGS. 1–5, as the collar moves from the disengaged to the engaged position, accompanied by the desired increasing axial force vector of the springs. It should be noted that the spring mounting arrangement of the embodiment of FIG. 17 can be utilized in the other embodiments of this invention so as to result in the greater rate of increase and decrease of the spring force vectors.

Figure 19:
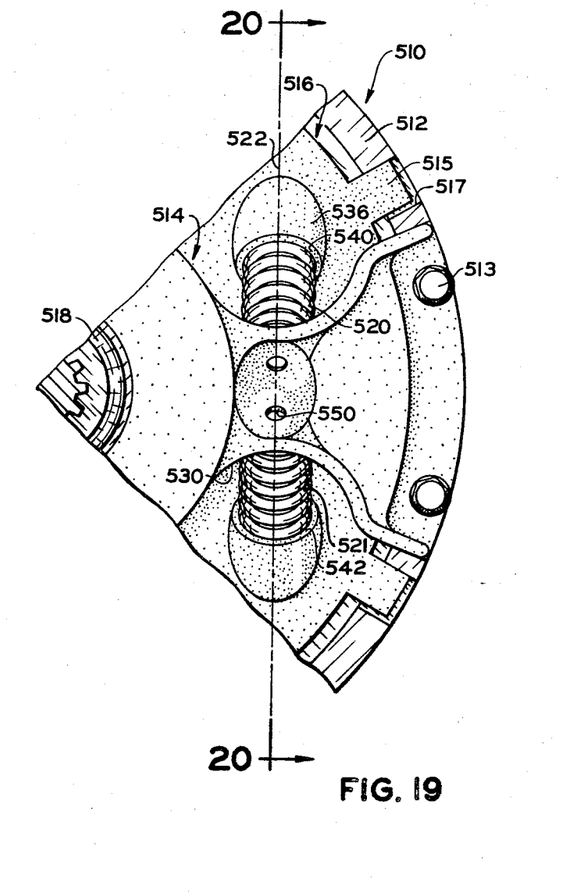
FIG. 19 is an end elevational view of a portion of another embodiment of this invention.
Figure 20:
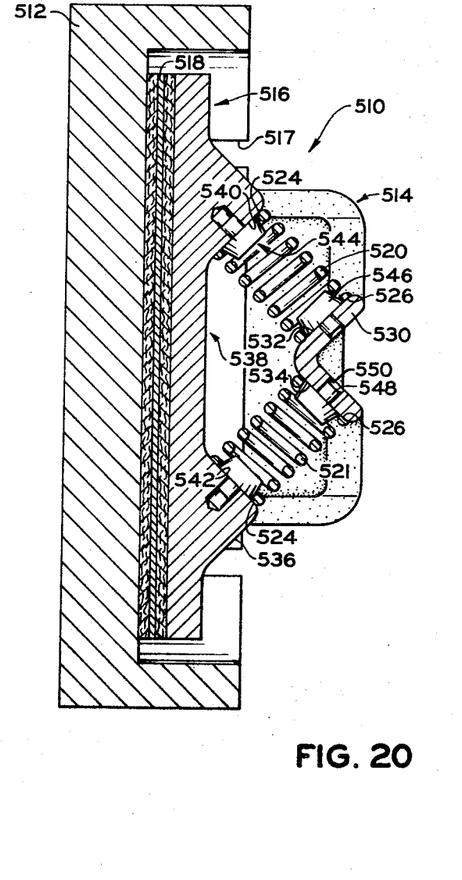
FIG. 20 is a sectional view taken along the line 20—20 in FIG. 19.

Referring now to FIGS. 19 and 20, a portion of a clutch is shown generally at 510 and includes a flywheel 512 having peripherally secured thereto, as by a plurality of bolts 513 at circumferentially spaced locations, a cover 514, which cover is axially spaced to the right of the flywheel as seen in FIG. 20. Interposed between the cover 514 and the flywheel 512 and axially movable relative thereto is a pressure plate 516 suitably drivingly connected to the flywheel 512 for unitary rotation as by a plurality of drive lugs 515 extending radially from the pressure plate into a cooperative axially elongated slot 517 formed in the flywheel 512. The portion of the clutch 510 which is not shown in FIGS. 19 and 20 includes a plurality of levers and the various cover and pressure plate structures cooperating therewith, such as shown in the embodiment of FIGS. 11 and 12, for moving the pressure plate axially to the right to its disengaged position relative to the driven disk assembly 518 disposed between the pressure plate and the flywheel.

Resilient means are provided for urging the pressure plate 516 axially to the left and toward the flywheel whereby to compress the driven disk 518 therebetween in a condition referred to as the engaged position of the clutch 510. More particularly, a plurality of pairs of coiled compression springs 520 and 521 are compressed and act between the cover 514 and the pressure plate 516 and each spring is disposed so that its axis lies in a plane, indicated by the line 522, which is parallel to the axis of rotation of the clutch. Additionally, the axis of each spring 520 and 521, though lying in the parallel plane 522, is angularly displaced in a transverse direction with respect to the axis of rotation of the clutch so that, while extending generally axially, the spring axes are not axially straight, and the action and reaction ends 524 and 526 of each spring are transversely displaced from each other. The plurality of springs 520 and 521 are disposed in cooperative pairs with the springs of a pair of springs being displaced in an opposite angular relationship so that the components of the spring force urging the pressure plate 516 to rotate circumferentially are substantially balanced. It should be noted that a slight amount of circumferential unbalance may be intentionally induced to serve as an antirattle preload by, for example, and as seen in FIG. 19, having the spring shown at 520 having a slightly greater biasing force than the remaining springs for urging the pressure plate counterclockwise with a slight though sufficient load to resiliently maintain the side of the lug 515 in engagement with the side of the slot 517 when the pressure plate is not in its engaged position.

The cover 514 includes a plurality of radially extending portions or arms 530, with each arm being disposed circumferentially intermediate a pair of springs 520 and 521. The undersurface of the arms 530, in the vicinity of the springs, is of V-shape when viewed in cross section (see FIG. 20) so as to present oppositely facing inclined abutting reaction surfaces 532 and 534. The pressure plate 516 is provided with a boss 536 which projects toward the arm 530 and is at an equal radial distance with respect to the surfaces 532 and 534, and a generally radially extending slot 538 is provided in the boss and has oppositely inclined sides or abutting action surfaces 540 and 542; the side 540 being parallel to the surface 532 and the side 542 being parallel to the surface 534.

The reaction ends 526 of the springs 520 and 521, respectively, engage the surfaces 532 and 534 on the arm 530 and react thereagainst while the action ends 524 of the springs 520 and 521, respectively, engage the inclined sides 540 and 542 on the pressure plate 516 and act thereagainst, so that the springs 520 and 521 constantly urge the pressure plate away from the cover 514 and toward the flywheel 512. A pilot element 544 is secured to each of the surfaces 532 and 534 and each of the sides 540 and 542 and has a truncated conical portion 546 pilotingly projecting into the spring 520 or 521 and a trunnion portion 548 extending from the base of the conical portion and pressed into a bore 550 in the surface or side carrying the element, whereby the springs are prevented from being displaced from the surface or side engaged thereby.

As in the embodiments of this invention previously described herein, as the pressure plate 516 moves axially between its engaged and disengaged positions, the inclined sides 540 and 542 move axially relative to the surfaces 532 and 534, respectively, in a parallel path so as to vary the axial distance between the sides and surfaces, while the sides 540 and 542 remain at a constant radial distance from the surfaces 532 and 534 and from the axis of rotation of the clutch (the radial distance between the surface and side engaging a given spring remains zero). Thus, as seen in FIG. 20, the angle between the springs 520 and 521 and with respect to the axial straight direction increases as the pressure plate 516 moves toward disengagement and decreases as it moves toward engagement so as to result in the desired variation in the axial vector of the spring force. The springs 520 and 521, when compressed upon movement of the pressure plate 516 toward its disengaged position, are bent in the same manner as the spring of the embodiment of FIGS. 11–13; however, the various other means for mounting the springs which are disclosed hereinbefore can be utilized in this embodiment. It is contemplated that the springs 520 and 521 can be radially inclined, in addition to being transversely inclined, in practicing the teachings of this invention.

While several embodiments of this invention have been shown and described it is readily apparent that many changes can be made therein without departing from the scope of this invention as defined by the following claims.

What is claimed is:

1. A spring loaded clutch comprising in combination (a) a driving means having an axis of rotation and including a reaction means, (b) a driven means adapted to be driven by said driving means for rotation therewith, (c) an engaging means carried by said driving means for coaxial unitary rotation and axial movement relative thereto and being movable into an engaged and a disengaged relationship with said driven means, (d) operating means carried by said driving means and said engaging means and including (1) resilient means having axially spaced action and reaction ends with said ends having a conjoint axis and the force of said resilient means acting in the direction of said axis, (2) first and second axially spaced abutting means engaging said action and reaction ends respectively and directing the force of said resilient means to act between said reaction means and said engaging means for urging said reaction means toward its engaged relationship, and (3) disengaging means for moving said engaging means into its disengaged relationship and including a manipulatable portion, (e) said operating means (1) maintaining each of said abutting means at a constant radial distance from said axis of rotation during movement of said engaging means, (2) positioning said abutting means with the conjoint axis thereof and the conjoint axis of said resilient means disposed angularly with respect to said axis of rotation when said engaging means is in its engaged position, (3) moving said engaging means toward its disengaged relationship and progressively reducing the axial distance between said abutting means, and (4) progressively increasing the axial distance between said abutting means as said resilient means moves said engaging means toward its engaged relationship for progressively decreasing and increasing the axial vector of the force of said resilient means, respectively.

2. A spring loaded clutch according to claim 1 wherein said resilient means is compressed between said reaction means and said engaging means and the manipulatable portion of said disengaging means moves said engaging means to its disengaged position against the force of said resilient means.

3. A spring loaded clutch according to claim 1 wherein said resilient means acts between said reaction means and a portion of the disengaging means and through the latter acts upon said engaging means to move the same to its engaged position and upon movement of the manipulatable portion of said disengaging means said disengaging means is operable to remove the force of said resilient means from said engaging means, said disengaging means also including a second resilient means for moving said engaging means to its disengaged relationship upon removal of the load of said first resilient means therefrom.

4. A rotatable spring loaded friction clutch including (a) a driving member mounted for rotation about an axis, (b) a driven disk assembly mounted for axial movement relative thereto, (c) a pressure plate mounted for rotational movement with said driving member and adapted for axial movement relative thereto, (d) a cover plate for said clutch assembly, (e) resilient spring means acting between the pressure plate and cover plate and disposed angularly relative to the axial direction and including an action end acting against an action load bearing means and a reaction end reacting against a reaction load bearing means, (g) the action and reaction ends of said resilient spring means having a conjoint axis with the force of said resilient spring means acting in the direction of said conjoint axis, (h) said action load bearing means moving in a line which lies in an axially extending plane parallel to the axially extending plane containing the reaction load bearing means and moving axially toward said reaction load bearing means as said pressure plate moves toward disengagement, (i) whereby the axial component of spring force decreases while the radial component of spring force increases as the pressure plate moves from engaged to disengaged positions.

5. The rotatable spring loaded friction clutch set forth in claim 4 wherein the resilient spring means is arranged with its action end disposed radially inwardly in relation to its reaction end.

6. The rotatable spring loaded friction clutch set forth in claim 4 wherein the resilient spring means is arranged with its action end disposed radially outwardly in relation to its reaction end.

7. The rotatable spring loaded friction clutch set forth in claim 4 wherein the resilient spring means is arranged with its action end disposed at an equal radial distance in relation to its reaction end.

8. A spring loaded clutch comprising in combination (a) a driving means having an axis of rotation and including a reaction means, (b) a driven means adapted to be driven by said driving means for rotation therewith, (c) an engaging means carried by said driving means for coaxial unitary rotation and axial movement relative thereto and being movable into an engaged and a disengaged relationship with said driven means, (d) resilient means having spaced action and reaction ends with a conjoint axis along which the force of said resilient means acts and including first and second means respectively connecting said ends to said reaction means and said engaging means, (e) said first and second means respectively including first and second abutting means which respectively engage said action and reaction ends, (f) said first and second means positioning said abutting means in an axially spaced relationship with the conjoint axis of said abutting means and said resilient means being disposed angularly with respect to said axis of rotation when said engaging means is in engagement with said driven means and moving at least one of said abutting means to axially approach the other while maintaining both of the same at a constant radial distance as said engaging means moves into a disengaged relationship with said driven means for decreasing the axial vector of the force of said resilient means, (g) and disengaging means including at least a portion of at least one of said aforementioned means for moving said engaging means axially away from said driven means and into a disengaged relationship therewith and for simultaneously moving said one abutting means to decrease the axial distance between said abutting means.

9. A spring loaded clutch as set forth in claim 8 wherein, at least one of said abutting means includes a first and a second pivot element, said first pivot element having a first portion engaging the associated end of said resilient means and a second portion extending from said first portion toward the other end of said resilient means, and said second pivot element pivotally engages said second portion of said first pivot element at a location placed from said associated end toward the other end of said resilient means.

10. The spring loaded clutch as set forth in claim 8 wherein the conjoint axis of said resilient means extends in a transversely inclined relationship relative to the axial direction.

11. The spring loaded clutch as set forth in claim 8 wherein the conjoint axis of said resilient means is in a longitudinally inclined relationship with said axis of rotation.

12. A spring loaded clutch comprising in combination (a) a driving means having an axis of rotation and including a reaction means, (b) a driven means adapted to be driven by said driving means for rotation therewith, (c) an engaging means carried by said driving means for coaxial unitary rotation and axial movement relative thereto and being movable into an engaged and a disengaged relationship with said driven means, (d) a resilient means having axially spaced action and reaction ends with said ends having a conjoint axis and with the force of said resilient means acting in the dirction of said conjoint axis, (e) first connecting means connecting said action end to said engaging means for urging the latter toward its engaged position and including a first abutting portion engaging said action end, (f) second connecting means connecting said reaction end to said reaction means and including a second abutting portion engaging said reaction end, (g) said abutting portions being axially spaced and having a conjoint axis disposed at an angle respect to said axis of rotation with said first abutting portion being axially movable toward said second abutting portion in a path lying at a constant radial distance from said axis of rotation, (h) and means for moving said first abutting portion axially toward said second portion to compress said resilient means therebetween and remove the action load of said resilient means from said engaging means.

13. The spring loaded clutch as set forth in claim 12 wherein said first connecting means includes a lever and pivot means pivotally connecting said lever to said driving means, said lever extending radially inwardly and outwardly from said pivot means, and another abutment means connected to the portion of said lever disposed radially outwardly from said pivot means and being movable against and away from said engaging means upon pivotal movement of said lever for moving said engaging means to its engaged position and for removing the load of said resilient means from said engaging means, respectively.

14. A spring loaded clutch according to claim 12 wherein said driving means includes a flywheel and a cover means secured thereto, said cover means has a portion which is axially spaced from said flywheel, said driven means is a friction disk assembly disposed axially intermediate said portion of said cover means and said flywheel and adapted to frictionally engage the latter, said engaging means is a pressure plate disposed axially intermediate said friction disk assembly and said cover means portion is axially movable relative to both of the same and adapted to frictionally engage the friction disk assembly and compress the latter between said pressure plate and said flywheel, said second connecting means includes a plurality of second abutting surface means carried by said cover and facing axially and radially outwardly with respect to said flywheel, said first connecting means includes a collar member and a plurality of radially extending levers, said levers each being pivotally mounted at a position radially intermediate its ends to said cover means and connected to said collar member at its radially inner end and abutting said pressure plate at their radially outer end whereby axial movement of said collar toward said pressure plate pivots the outer end of said levers away from said flywheel while axial movement of said collar away from said pressure plate pivots said levers such that the outer ends thereof press against said pressure plate, said collar having a plurality of first abutting surface means thereon with each of the same disposed substantially parallel to and paired with one of said second abutting surface means, and said resilient means is a plurality of circumferentially spaced coil compression springs with each of said springs cooperatively positioned with a pair of abutting surface means and with its ends engaging said first and second abutting surface means and with the axes of said springs disposed in an inclined relationship with respect to the axis of rotation of said clutch for urging said collar axially away from said flywheel and thereby urging the radial outer ends of said levers axially toward said flywheel for pressing said pressure plate against said driven disk assembly.

15. The spring loaded clutch as set forth in claim 12 wherein said first connecting means includes a lever and pivot means pivotally connecting said lever to said driving means, said lever extending radially inwardly from said pivot means, and another abutment means on said lever disposed radially inwardly from said pivot means and being movable against and away from said engaging means upon movement of said lever for moving said engaging means to its engaged position and for removing the load of said resilient means from said engaging means respectively.

16. A spring loaded clutch according to claim 12 wherein said driving means includes a flywheel and a cover means secured thereto, said cover means has a portion which is axially spaced from said flywheel, said driven means is a friction disk assembly disposed axially intermediate said portion of said cover means and said flywheel and adapted to frictionally engage the latter, said engaging means is a pressure plate disposed axially intermediate said friction disk assembly and said cover means portion and is axially movable relative to both of the same and adapted to frictionally engage the friction disk assembly and compress the latter between said pressure plate and said flywheel, said second connecting means includes a plurality of second abutting surface means carried by said cover means and facing radially inwardly and axially inwardly with respect to said flywheel, said first connecting means includes a collar member and a plurality of radially extending levers, said levers each being pivotally mounted at a position adjacent its radially outer end to said cover means and connected to said collar member at its radially inner end and abutting said pressure plate at a position radially intermediate its ends whereby axial movement of said collar toward said pressure plate pivots the intermediate portion of said levers toward said flywheel to press against said pressure plate while axial movement of said collar away from said flywheel pivots said levers such that the intermediate portion thereof moves away from said flywheel, said collar having a plurality of first abutting surface means thereon with each of the same disposed substantially parallel to and paired with one of said second abutting surface means, and said resilient means is a plurality of circumferentially spaced coil compression springs with each of said springs cooperatively positioned with a pair of abutting surface means and with its ends engaging said first and second abutting surface means and with the axes of said springs disposed in an inclined relationship with respect to the axis of rotation of said clutch for urging said collar axially toward said flywheel and thereby urging the intermediate portion of said levers axially toward said flywheel for pressing said pressure plate against said driven disk assembly.

17. A spring loaded clutch as set forth in claim 12 wherein, at least one of said abutting portions includes a first and a second pivot element, said first pivot element having a first portion engaging the associated end of said resilient means and a second portion extending from said first portion toward the other end of said resilient means and said second pivot element pivotally engages said second portion of said first pivot element at a location displaced from said associated end toward the other end of said resilient means.

18. A spring loaded clutch comprising in combination (a) a driving member having an axis of rotation and including a reaction means, (b) a driven member adapted to be driven by said driving member for rotation therewith disposed in axially spaced relationship with said reaction means, (c) an engaging means carried by said driving means disposed axially intermediate said reaction means and said driven means and axially movable relative thereto into engagement and disengagement with said driven means and unitarily rotatable with said driving means, (d) resilient means having axial spaced action and reaction ends and being compressed between said reaction means and said engaging means, (e) said action and reaction ends having a conjoint axis with the force of said resilient means acting in the direction of said conjoint axis and said resilient means being positioned with said conjoint axis disposed in an angular relationship with respect to said axis of rotation, (f) first and second abutting means engaging said action and reaction ends respectively and having a conjoint axis disposed in an angular relationship with respect to said axis of rotation, (g) said first and second abutting means being axially spaced and respectively connected to said engaging means and said reaction means with said first abutting means being movable axially toward said second abutting means in a path which remains at a constant radial distance from said axis as said engaging means moves into a disengaged relationship with said driving means for decreasing the axial vector of force of said resilient means, (h) and moving means carried by said driving member and connected to said engaging means for moving said engaging means axially toward said reaction means against the force of said resilient means to its disengaged position while moving said first abutting means axially toward said second abutting means for compressing said resilient means between said engaging means and said reaction means.

19. A spring loaded clutch as set forth in claim 18 wherein said reaction means includes a first portion secured to said driving member and a second portion movable relative to said first portion, said moving means connects said portions, and said resilient means imposes its reaction load against said second portion which in turn imposes said reaction load upon said first portion through said moving means.

20. A spring loaded clutch as set forth in claim 19 wherein said moving means includes a manipulatable portion and another portion, and said other portion also imposes the reaction load from said resilient means on said engaging means.

21. A spring loaded clutch as set forth in claim 20 wherein said moving means is a plurality of radially extending levers, pivotable means mount each of said levers to said first portion of said reaction means at a location radially intermediate the ends of said levers, the manipulatable portion of said levers is disposed radially inwardly of said pivotable means, the other portion of said moving means is the radially outward portion of said levers, linkage means connects the radially outward portion of said levers for substantially unitary axial movement with said engaging means, and said second portion of said reaction means imposes the reaction load of said resilient means on said levers at a location radially inward of said pivotable means.

22. A spring loaded clutch as set forth in claim 18 wherein said first and said second abutting means each has an abutting surface thereon with said surfaces being oppositely disposed, said action and reaction ends seat on the abutting surface on said first and second abutting means respectively, said abutting surfaces have a conjoint axis, and the conjoint axis of said abutting surfaces and the conjoint axis of said resilient means are longitudinally inclined with respect to said axis of rotation.

23. A spring loaded clutch as set forth in claim 18 wherein said first and said second abutting means each has an abutting surface thereon with said surfaces being oppositely disposed said action and reaction ends of said resilient means seat the abutting surfaces on said first and said second abutting means, respectively, said abutting surfaces have a conjoint axis, and the conjoint axis of said abutting surfaces and the conjoint axis of said resilient means are transversely inclined with respect to said axis of rotation.

24. A spring loaded clutch according to claim 18 wherein said driving member includes a flywheel and a clutch cover, said driven member is a driven disk assembly, said engaging means is a pressure plate, said moving means is a plurality of levers pivotally mounted on said cover and connected to said pressure plate and said resilient means is a plurality of coiled compression springs compressed between abutting surfaces on said cover and said pressure plate.

25. A mounting means for a coiled compression spring usable in a spring loaded clutch rotatable about an axis, including a pair of mounting means with one such means engaging at each end of said spring for receiving the force thereof, said mounting means being axially spaced and in opposed relation and with said spring extending angularly therebetween relative to said axis when the clutch is engaged and carrying means carried by said clutch and carrying said mounting means at a constant radial distance from said axis and for axial movement away from and toward each other during engaging and disengaging action of said clutch, respectively, for increasing and decreasing the axial component of spring force as said clutch moves toward engagement and disengagement, respectively, said carrying means carrying said mounting means at said constant radial distance during said axial movement.

26. The mounting means of claim 25 wherein each said mounting means includes means for inhibiting movement of the end of the spring engaging the same relative thereto.

27. The mounting means of claim 25 wherein each said mounting means includes means pivotally engaging the end of the spring engaging such mounting means.

28. The mounting means of claim 25 wherein each said mounting means includes a first pivot member having a first portion engaging the end of the spring and an integral second portion projecting toward the other end of the spring and a second pivot member carried by said carrying means and including a pivot portion extending from said carrying means and pivotally engaging said integral second portion.

References Cited
UNITED STATES PATENTS

| | | | |
|---|---|---|---|
| 2,068,885 | 1/1937 | Lyman et al. | 192—68 XR |
| 2,515,277 | 7/1950 | Thelander et al. | 192—68 |
| 2,727,612 | 12/1955 | Thelander et al. | 192—99 |
| 2,760,615 | 8/1956 | Kershner | 192—69 |
| 2,765,892 | 10/1956 | Reed | 192—99 |
| 3,276,555 | 10/1966 | Phelps et al. | 192—99 XR |

BENJAMIN W. WYCHE III, *Primary Examiner.*